(12) United States Patent
Li et al.

(10) Patent No.: US 11,150,699 B2
(45) Date of Patent: Oct. 19, 2021

(54) EXPANSION CHASSIS FOR NOTEBOOK COMPUTER

(71) Applicant: SHENZHEN SDION ELECTRONICS & TECHNOLOGY CO., LTD, Shenzhen (CN)

(72) Inventors: Jiayang Li, Shenzhen (CN); Jianxiang Feng, Shenzhen (CN)

(73) Assignee: SHENZHEN SDION ELECTRONICS & TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 16/851,787

(22) Filed: Apr. 17, 2020

(65) Prior Publication Data

US 2020/0341511 A1 Oct. 29, 2020

Related U.S. Application Data

(63) Continuation of application No. PCT/CN2019/087764, filed on May 21, 2019.

(30) Foreign Application Priority Data

Apr. 24, 2019 (CN) .......................... 201920568698.5

(51) Int. Cl.
*G06F 1/16* (2006.01)
*G06F 1/26* (2006.01)

(52) U.S. Cl.
CPC ............ *G06F 1/1632* (2013.01); *G06F 1/266* (2013.01)

(58) Field of Classification Search
CPC ............................... G06F 1/1632; G06F 1/266
See application file for complete search history.

(56) References Cited

U.S. PATENT DOCUMENTS

| 9,651,994 B1* | 5/2017 | Yang | G06F 1/1632 |
| 2013/0148289 A1* | 6/2013 | Kwon | G06F 1/1632 |
| | | | 361/679.43 |
| 2020/0026329 A1* | 1/2020 | Fujii | G06F 1/1632 |

* cited by examiner

*Primary Examiner* — Mukundbhai G Patel
(74) *Attorney, Agent, or Firm* — WPAT, PC

(57) ABSTRACT

The present invention discloses an expansion chassis for a notebook computer, including: a base, wherein the base is provided with a plug-in area, and a first circuit board is disposed inside the base; a plug-in mechanism including a plurality of plug-in interfaces electrically connected to the first circuit board; a clamping mechanism including a fixed clamping arm and a movable clamping arm, the fixed clamping arm is provided with a connecting plug, and the movable clamping arm is provided with a fixed structure; and a second circuit board, wherein the second circuit board is electrically connected to the first circuit board, the connecting plug is electrically connected to the second circuit board, the upper surface of the base is in contact with the bottom surface of the notebook computer, and the upper surface of the base is matched with the bottom surface of the notebook computer to form surface contact.

9 Claims, 2 Drawing Sheets

EXPANSION CHASSIS FOR NOTEBOOK COMPUTER

FIELD OF THE DISCLOSURE

The present invention relates to the technical field of computer accessories, in particular to an expansion chassis for a notebook computer.

BACKGROUND

Notebook computers are also known as "portable computers". The biggest feature thereof is the compact size, which makes the notebook computers easier to carry than personal computers (PC). Although the body of the notebook computer is very light, there is no need to doubt its applicability. In daily operations, basic business and entertainment operations, the notebook computers are fully qualified. The current development trend is that the size is smaller and smaller, and the weight is lighter and lighter, but the functions are more powerful. In order to reduce the size, the notebook computers now use liquid crystal displays (LCDs) to provide a better visual effect to users.

With the development and advancement of science and technology, the notebook computers are mostly developed toward a thin and light direction. Nowadays, the notebook computers generally have only one or two connection ports, and there are few types of connection ports. As a result, the notebook computers cannot be directly connected to multiple electronic devices with different types of plugs, causing a lot of trouble to the use of people.

An expansion slot described in the invention patent (All-In-One Expansion Slot for Notebook Computers with the authorization publication number CN202838098U) can effectively solve the above problems. However, during the use of the expansion slot, a bottom shell of the notebook computer needs to be disassembled at first, and then a computer connector receptacle of the expansion slot is connected to a connector of the notebook computer before use, so the expansion slot is very inconvenient for users to use. The expansion slot needs to be removed when not in use, and cannot be directly integrated with the notebook computer, which is not convenient for the users to carry and use.

SUMMARY

The technical problem to be solved by the present invention is to provide an expansion chassis for a notebook computer regarding the deficiencies of the prior art. The expansion chassis can provide more plug-in interfaces for the notebook computer, and can be integrated with the notebook computer. The expansion slot does not need to be disassembled after connection, which is convenient for the user to carry, and can be used as a heat dissipation base to improve the working stability of the notebook computer.

An expansion chassis for a notebook computer, including: a base, wherein the base is provided with a plug-in area, and a first circuit board is disposed inside the base; a plug-in mechanism, disposed in the plug-in area, wherein the plug-in mechanism is electrically connected to the first circuit board, and the plug-in mechanism includes a plurality of plug-in interfaces; a clamping mechanism configured to fixedly mounting the expansion chassis under the notebook computer, wherein the clamping mechanism includes a fixed clamping arm and a movable clamping arm; the fixed clamping arm is fixedly disposed at one end of the base, and the movable clamping arm is telescopically mounted at the other end of the base; the fixed clamping arm is provided with at least one connecting plug adapted to a connecting interface of the notebook computer, and the connecting plug enables the expansion chassis to be communicatively connected to the notebook computer; and the movable clamping arm is provided with a fixed structure matched with an interface of the notebook computer; and a second circuit board, disposed in the fixed clamping arm, wherein the second circuit board is electrically connected to the first circuit board, and the connecting plug is electrically connected to the second circuit board; wherein an upper surface of the base is configured to contact a bottom surface of the notebook computer, and the upper surface of the base is matched with the bottom surface of the notebook computer to form surface contact; the fixed clamping arm and the movable clamping arm are configured to clamp two sides of the notebook computer, the connecting plug is configured to be plugged into a connecting interface of the notebook computer, and the fixed structure is configured to be plugged into an interface of the notebook computer, and achieves a fixed connection with the interface of the notebook computer.

Optionally, the connecting plug is a Type-C plug, and at least one Type-C plug is disposed and is configured to supply power to the expansion chassis by the notebook computer and/or enable the notebook computer to establish a data communication connection with the expansion chassis.

Optionally, the plug-in interfaces of the plug-in mechanism include at least one Type-C plug-in port; and the fixed structure is a mounting plug adapted to a headphone jack of the notebook computer.

Optionally, the base includes a bottom box and a cover plate covering the bottom box, the bottom box includes a first main body portion and a first clamping portion formed by bending from one end of the first main body portion upward, the cover plate includes a second main body portion and a second clamping portion formed by bending from one end of the second main body portion upward, the fixed clamping arm is formed by surrounding the first clamping portion and the second clamping portion, the second clamping portion is provided with a mounting hole for the connecting plug to protrude, the upper surface of the second main body portion is provided with recesses adapted to pad feet of the notebook computer, and the upper surface of the second main body portion matches the bottom surface of the notebook computer to form surface contact.

Optionally, the outer side surface of the first main body portion is flush with a corresponding side surface of the notebook computer.

Optionally, a slot adapted to the second circuit board is disposed in the first clamping portion, the connecting plug and the second circuit board are disposed perpendicular to each other, and the connecting plug penetrates through the mounting hole to extend out of the inner side surface of the second clamping portion.

Optionally, the clamping mechanism further includes a tension spring, the movable clamping arm includes a mounting portion and a clamping arm portion formed by bending and extending from the outer end of the mounting portion upward, the mounting portion is provided with a first mounting column, the first main body portion is provided with a through slot adapted to the mounting portion and a second mounting column adapted to the first mounting column, the through hole is disposed in the side surface of the first main body portion away from the first clamping portion, the second mounting column is disposed in the first main body portion, the mounting portion of the movable clamping arm penetrates through the through hole to extend into the first main body portion, one end of the tension spring sleeves the first mounting column, the other end of the tension spring sleeves the second mounting column, and the mounting plug is disposed on the clamping arm portion.

Optionally, The expansion chassis for a notebook computer according to claim 7, wherein a limiting block and a limiting slot adapted to the mounting portion are disposed in the first main body portion, the slot bottom of the limiting slot is provided with a guide rib for stably moving the mounting portion, the inner end surface of the mounting portion abuts against the outer end surface of the limiting block, and the first main body portion is provided with a plurality of heat dissipation holes for facilitating heat dissipation.

Optionally, The expansion chassis for a notebook computer according to claim 1, wherein the bottom of the base is provided with hidden pad feet or non-slip pad feet; the inner sides of the movable clamping arm and the fixed clamping arm are provided with soft rubber pads; and the upper surface of the base is provided with a retreating slot, and the retreating slot is configured to form a heat dissipation gap with the bottom surface of the notebook computer for facilitating heat dissipation of the notebook computer.

Optionally, the first main body portion is provided with a third mounting column protruding upward, the third mounting column is axially provided with a screw hole, the lower end surface of the cover plate is provided with a fourth mounting column protruding downward, the fourth mounting column is axially provided with a mounting slot adapted to the third mounting column, the slot bottom of the mounting slot is axially provided with a through hole adapted to the screw hole, and the cover plate is mounted above the bottom box by the cooperation between the third mounting column and the mounting slot, and the cooperation between the bolt penetrating through the through hole and the screw hole.

The present invention has the beneficial effects that the upper surface of the base is configured to contact the bottom surface of the notebook computer, and the upper surface of the base is matched with the bottom surface of the notebook computer to form surface contact. The clamping mechanism enables the expansion chassis to be fixedly mounted below the notebook computer, so that the expansion chassis can be integrated with the notebook computer, and does not need to be removed when not in use, which is convenient for the user to carry. The expansion chassis has multiple plug-in interfaces, which can provide multiple plug-in interfaces for the notebook computer. The expansion chassis raises the notebook computer, so that the heat of the notebook computer can be quickly transferred to the air, thereby playing a head dissipation function, effectively avoiding the situation that the notebook computer stops operation due to overheating, and improving the working stability of the notebook computer. The expansion chassis is provided with heat dissipation holes, which can further help the notebook computer to dissipate heat and improve the working stability of the notebook computer. The mounting portion of the movable clamping arm penetrates through the through hole to extend into the first main body portion, one end of the tension spring sleeves the first mounting column, and the other end of the tension spring sleeves the second mounting column. Therefore, on one hand, the base can be mounted under the notebook computer in a fitting manner to serve as a base of the notebook computer, and on the other hand, the expansion chassis can also be adapted to the notebook computers of different sizes, so as to expand the scope of application of the expansion chassis. The bottom of the base is provided with hidden pad feet or non-slip pad feet, so that the expansion chassis can be used not only as a base for the notebook computer, but also as a stand for the notebook computer, thereby expanding the use functions of the expansion chassis.

Figure 1:
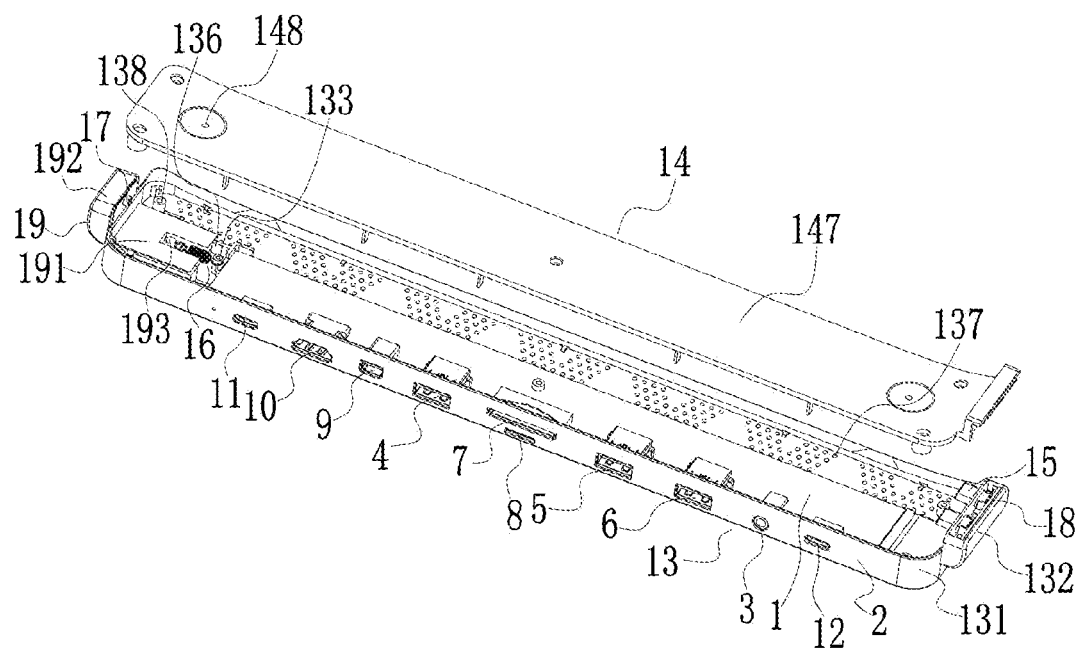
FIG. 1 is an exploded view of an embodiment of the present invention.
Figure 2:
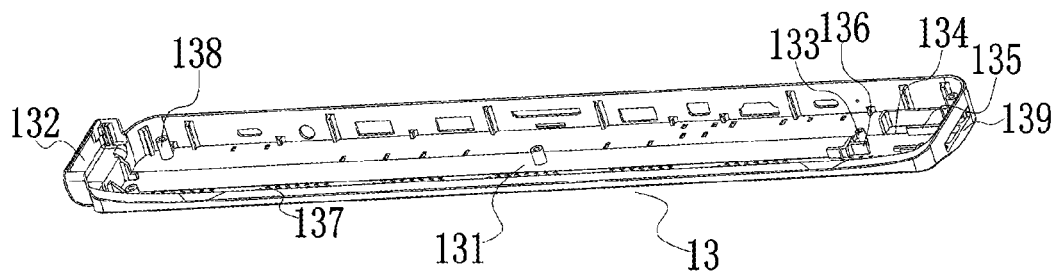
FIG. 2 is a structural diagram of a bottom box of the present invention.
Figure 3:
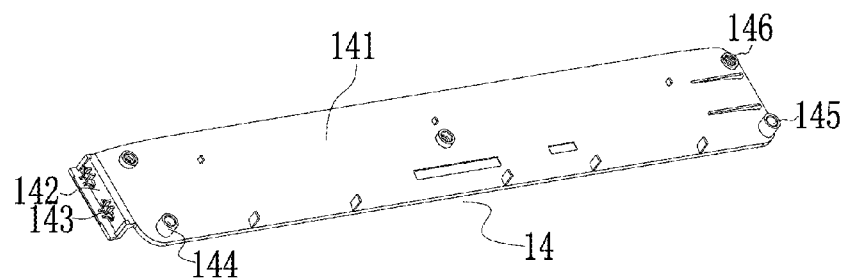
FIG. 3 is a structural diagram of a cover plate of the present invention.
Figure 4:
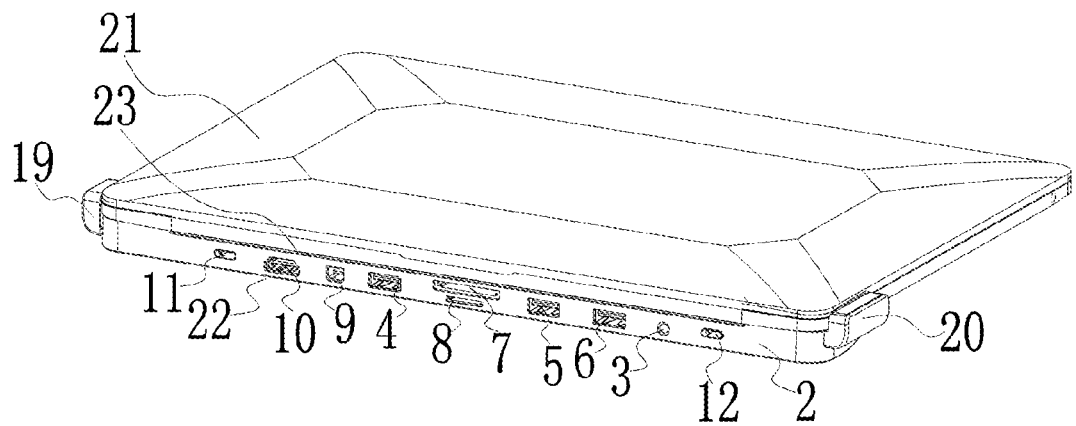
FIG. 4 is a use state diagram of an embodiment of the present invention.

In the drawings: 1—first circuit board, 2—plug-in area, 3—audio plug-in port, 4—first USB plug-in port, 5—second USB plug-in port, 6—third USB plug-in port, 7—SD card plug-in port, 8—TF card plug-in port, 9—DP digital video plug-in port, 10—HDMI digital video plug-in port, 11—first Type-C plug-in port, 12—second Type-C plug-in port, 13—bottom box, 131—first main body portion, 132—first clamping portion, 133—second mounting column, 134—limiting slot, 135—guide rib, 136—limiting block, 137—heat dissipation hole, 138—third mounting column, 139—through slot, 14—cover plate, 141—second main body portion, 142—second clamping portion, 143—mounting hole, 144—fourth mounting column, 145—mounting slot, 146—through hole, 147—recess, 15—connecting plug, 16—tension spring, 17—mounting plug, 18—second circuit board, 19—movable clamping arm, 191—mounting portion, 192—clamping arm portion, 193—first mounting column, 20—fixed clamping arm, 21—notebook computer, 22—base, 23—heat dissipation gap.

DETAILED DESCRIPTION OF PREFERRED EMBODIMENTS

The structural principle and working principle of the present invention will be further described in detail below with reference to the accompanying drawings.

As shown in FIG. 1 to FIG. 4, an expansion chassis for a notebook computer includes:

a base 22, wherein the base 22 is provided with a plug-in area 2, and a first circuit board 1 is disposed inside the base 22;

a plug-in mechanism, disposed in the plug-in area 2, wherein the plug-in mechanism is electrically connected to the first circuit board 1, and the plug-in mechanism comprises a plurality of plug-in interfaces;

a clamping mechanism configured to fixedly mounting the expansion chassis under the notebook computer 21, wherein the clamping mechanism includes a fixed clamping arm 20 and a movable clamping arm 19; the fixed clamping arm 20 is fixedly disposed at one end of the base 22, and the movable clamping arm 19 is telescopically mounted at the other end of the base 22; the fixed clamping arm 20 is provided with two connecting plugs 15 adapted to a connecting interface of the notebook computer 21, and the connecting plugs 15 enable the expansion chassis to be communicatively connected to the notebook computer 21; and the movable clamping arm 19 is provided with a mounting plug 17 adapted to a headphone jack of the notebook computer 21; and a second circuit board 18, disposed in the fixed clamping arm 20, wherein the second circuit board 18 is electrically connected to the first circuit board 1, and the connecting plugs 15 are electrically connected to the second circuit board 18.

The upper surface of the base 22 is configured to contact the bottom surface of the notebook computer 21, and the upper surface of the base 22 is matched with the bottom surface of the notebook computer 21 to form surface contact. The fixed clamping arm 20 and the movable clamping arm 19 are configured to clamp the two sides of the notebook computer 21. The connecting plugs 15 are configured to be plugged into the connecting interfaces of the notebook computer 21, and the mounting plug 17 is configured to be plugged into the headphone jack of the notebook computer 21 and achieves a fixed connection with the interface of the notebook computer 21.

As a preferred solution, the base 22 includes a bottom box 13 and a cover plate 14 covering the bottom box 13, and the bottom box 13 includes a first main body portion 131 and a first clamping portion 132 formed by bending from one end of the first main body portion 131 upward. The cover plate 14 includes a second main body portion 141 and a second clamping portion 142 formed by bending from one end of the second main body portion 141 upward. The fixed clamping arm 20 is formed by surrounding the first clamping portion 132 and the second clamping portion 142. The second clamping portion 142 is provided with mounting holes 143 for the connecting plugs 15 to protrude. The upper surface of the second main body portion 141 is provided with recesses 147 adapted to pad feet of the notebook computer 21. The upper surface of the second main body portion matches the bottom surface of the notebook computer 21 to form surface contact.

As a preferred solution, the outer side surface of the first main body portion 131 is flush with the corresponding side surface of the notebook computer 21, so that when being fixed to the notebook computer 21, the expansion chassis can be integrated with the notebook computer 21 without generating an incongruous sense, looks very beautiful, and meanwhile is very convenient for the user to carry.

As a preferred solution, the clamping mechanism further includes a tension spring 16, the movable clamping arm 19 includes a mounting portion 191 and a clamping arm portion 192 formed by bending and extending from the outer end of the mounting portion 191 upward. The mounting portion 191 is provided with a first mounting column 193, the first main body portion 131 is provided with a through slot 139 adapted to the mounting portion 191 and a second mounting column 133 adapted to the first mounting column 193. The through hole 146 is disposed in the side surface of the first main body portion 131 away from the first clamping portion 132. The second mounting column 133 is disposed in the first main body portion 131, and the mounting portion 191 of the movable clamping arm 19 penetrates through the through hole 146 to extend into the first main body portion 131. One end of the tension spring 16 sleeves the first mounting column 193, and the other end of the tension spring 16 sleeves the second mounting column 133. The mounting plug 17 is disposed on the clamping arm portion. Therefore, on one hand, the base 22 can be mounted under the notebook computer 21 in a fitting manner to serve as the base of the notebook computer 21, and on the other hand, the expansion chassis can also be adapted to the notebook computers 21 of different sizes, so as to expand the scope of application of the expansion chassis.

As a preferred solution, a limiting block 136 and a limiting slot 134 adapted to the mounting portion 191 are disposed in the first main body portion 131. The slot bottom of the limiting slot 134 is provided with a guide rib 135 for the mounting portion 191 to move stably. The inner end surface of the mounting portion 191 abuts against the outer end surface of the limiting block 136, so that the mounting portion 191 can move stably, and the inward movement stroke of the mounting portion 191 can be limited, thereby improving the working stability of the expansion chassis.

As a preferred solution, the first main body portion 131 is provided with a plurality of heat dissipation holes 137 for facilitating heat dissipation, thereby further helping the notebook computer 21 to dissipate heat and improving the working stability of the notebook computer 21.

As a preferred solution, the first main body portion 131 is provided with a third mounting column 138 protruding upward, and the third mounting column 138 is axially provided with a screw hole. The lower end surface of the cover plate 14 is provided with a fourth mounting column 144 protruding downward, and the fourth mounting column 144 is axially provided with a mounting slot 145 adapted to the third mounting column 138. The slot bottom of the mounting slot 145 is axially provided with a through hole 146 adapted to the screw hole, and the cover plate 14 is mounted above the bottom box 13 by the cooperation between the third mounting column 138 and the mounting slot 145, and the cooperation between the bolt penetrating through the through hole 146 and the screw hole.

As a preferred solution, hidden pad feet or non-slip pad feet are disposed on the bottom of the base 22. In this way, the expansion chassis can be used not only as a base for the notebook computer 21, but also as a stand for the notebook computer 21, thereby expanding the use functions of the expansion chassis.

As a preferred solution, soft rubber pads are mounted on the inner side of the movable clamping arm 19 and the fixed clamping arm 20. Due to the arrangement of the soft rubber pads, not only can the expansion chassis play a buffering action for the notebook computer 21, but also the expansion chassis is prevented from damaging the interface of the notebook computer or scratching the notebook computer 21.

As a preferred solution, the upper surface of the base 22 is provided with a retreating slot, which is configured to form a heat dissipation gap 23 with the bottom surface of the notebook computer 21 to facilitate heat dissipation of the notebook computer 21. In this way, the heat dissipation speed of the notebook computer 21 is accelerated, thereby further improving the working stability of the notebook computer 21.

The plug-in interface includes a first USB plug-in port 4, a second USB plug-in port 5, a third USB plug-in port 6, an SD card plug-in port 7, a TF card plug-in port 8, a DP digital video plug-in port 9, an HDMI digital video plug-in port 10, a first Type-C plug-in port 11 and a second Type-C plug-in port 12. The first Type-C plug-in port 11, the HDMI digital video plug-in port 10, the DP digital video plug-in port 9, the first USB plug-in port 4, the SD card plug-in port 7, the second USB plug-in port 5, the third USB plug-in port 6, the audio plug-in port 3, and the second Type-C plug-in port 12 are sequentially arranged in the plug-in area 2 of the plug-in interface from left to right. The TF card plug-in port 8 is disposed directly below the SD card plug-in port 7.

Figure 5:
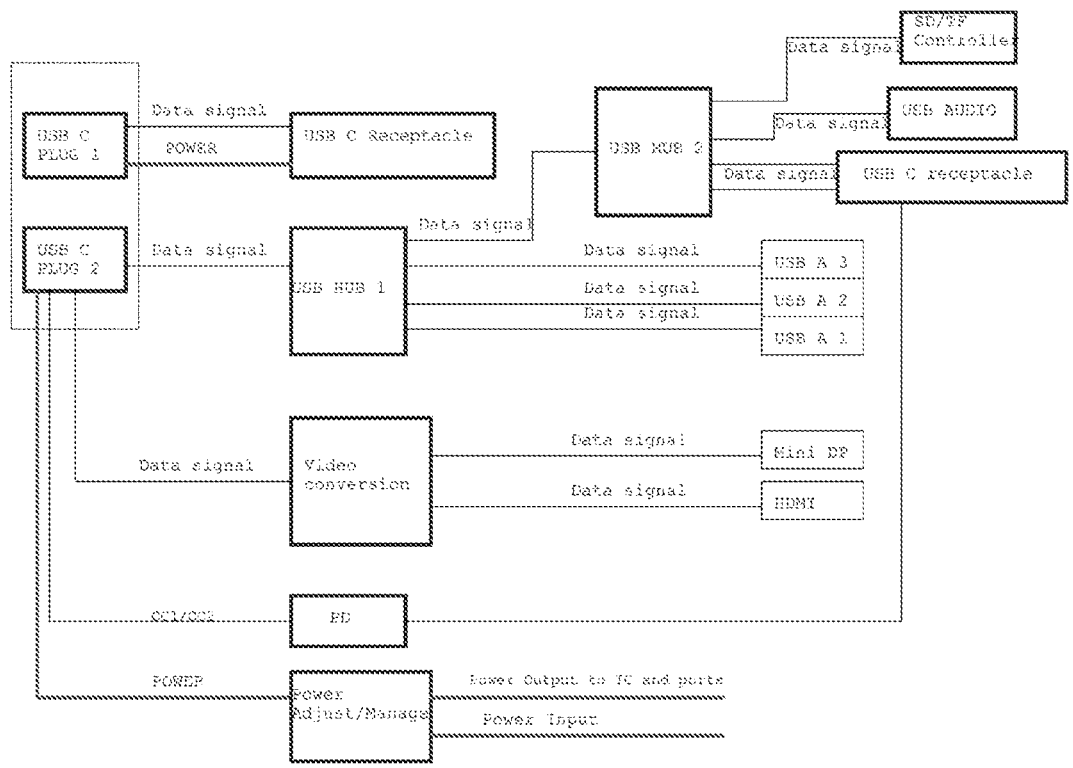
FIG. 5 is a connection relationship diagram between a connecting plug and a plug-in interface in an embodiment of the present invention.

It can be seen with reference to FIG. 1 and FIG. 5 that two connecting plugs 15 are disposed, and the two connecting plugs 15 are spaced apart from each other on the fixed clamping arm 20. The two connecting plugs 15 are both Type-C plugs, one of Type-C plugs is configured to supply power to the expansion chassis, and the other Type-C plug is configured to enable the plug-in interface on the expansion chassis to be communicatively connected to the notebook computer 21. The plug-in ports of the expansion chassis have rich types, and allow the notebook computer 21 to communicate with multiple external devices at the same time, thereby providing convenience for people.

As a preferred solution, the first circuit board 1 includes a power management module, and the power management module is electrically connected to the other Type-C plug. The current flows from one Type-C plug and flows into the power management module through the other Type-C plug. The power management module controls the incoming power and the power supplied to the first circuit board 1, the second circuit board 18, and respective plug-in interfaces. Thus, the expansion chassis can intelligently and reasonably supply power to each plug-in interface, and reduce unnecessary power loss.

It should be noted that the number of the connecting plugs 15 is not limited to two, but may be one or more. When the number of the connecting plugs 15 is one, the connecting plug 15 provides power for the expansion chassis, and meanwhile allows each plug-in interface on the expansion chassis to be communicatively connected to the notebook computer 21, and will be electrically connected to the power management module. The power management module controls the incoming power and the power supplied to respective plug-in interfaces. When the number of the connecting plugs 15 is more, the connection function of each connecting plug 15 is adjusted according to the actual situation. The type of the connecting plug 15 is not limited to the Type-C plug, but may also be a USB plug, a lightning plug and other types of plugs. The type of the plug-in interface is not limited to the type described in the above embodiment, and may be other types. The number of the various types of connecting interfaces is not limited to the number in the above embodiment, and can be increased or decreased at any time according to the actual situation.

The present invention has the beneficial effects that the upper surface of the base 22 is configured to contact the bottom surface of the notebook computer 21, and the upper surface of the base 22 is matched with the bottom surface of the notebook computer 21 to form surface contact. The clamping mechanism enables the expansion chassis to be fixedly mounted below the notebook computer 21, so that the expansion chassis can be integrated with the notebook computer 21, and does not need to be removed when not in use, which is convenient for the user to carry. The expansion chassis has multiple plug-in interfaces, which can provide multiple plug-in interfaces for the notebook computer 21. The expansion chassis raises the notebook computer 21, so that the heat of the notebook computer 21 can be quickly transferred to the air, thereby playing a head dissipation function, effectively avoiding the situation that the notebook computer 21 stops operation due to overheating, and improving the working stability of the notebook computer 21. The expansion chassis is provided with heat dissipation holes 137, which can further help the notebook computer to dissipate heat and improve the working stability of the notebook computer 21. The mounting portion 191 of the movable clamping arm 19 penetrates through the through hole 146 to extend into the first main body portion 131, one end of the tension spring 16 sleeves the first mounting column, and the other end of the tension spring 16 sleeves the second the mounting column 133. Therefore, on one hand, the base 22 can be mounted under the notebook computer 21 in a fitting manner to serve as the base of the notebook computer 21, and on the other hand, the expansion chassis can also be adapted to the notebook computers 21 of different sizes, so as to expand the scope of application of the expansion chassis. The bottom of the base 22 is provided with hidden pad feet or non-slip pad feet, so that the expansion chassis can be used not only as a base for the notebook computer 21, but also as a stand for the notebook computer 21, thereby expanding the use functions of the expansion chassis.

The foregoing is designed based on the notebook computer 21 of one of the models of Apple Computers in the present embodiment. Any minor modifications, equivalent changes, and modifications made according to the technical solution of the present invention and applied to other notebook computers 21 belong to the scope of the technical solution of the present invention.

What is claimed is:

1. An expansion chassis for a notebook computer, comprising:

a base, wherein the base is provided with a plug-in area, and a first circuit board is disposed inside the base;

a plug-in mechanism, disposed in the plug-in area, wherein the plug-in mechanism is electrically connected to the first circuit board, and the plug-in mechanism comprises a plurality of plug-in interfaces;

a clamping mechanism configured to fixedly mounting the expansion chassis under the notebook computer, wherein the clamping mechanism comprises a fixed clamping arm and a movable clamping arm; the fixed clamping arm is fixedly disposed at one end of the base, and the movable clamping arm is telescopically mounted at the other end of the base; the fixed clamping arm is provided with at least one connecting plug adapted to a connecting interface of the notebook computer, and the connecting plug enables the expansion chassis to be communicatively connected to the notebook computer; and the movable clamping arm is provided with a fixed structure matched with an interface of the notebook computer; and a second circuit board, disposed in the fixed clamping arm, wherein the second circuit board is electrically connected to the first circuit board, and the connecting plug is electrically connected to the second circuit board; wherein an upper surface of the base is configured to contact a bottom surface of the notebook computer, and the upper surface of the base is matched with the bottom surface of the notebook computer to form surface contact; the fixed clamping arm and the movable clamping arm are configured to clamp two sides of the notebook computer, the connecting plug is configured to be plugged into a connecting interface of the notebook computer, and the fixed structure is configured to be plugged into an interface of the notebook computer, and achieves a fixed connection with the interface of the notebook computer;

wherein the base comprises a bottom box and a cover plate covering the bottom box, the bottom box comprises a first main body portion and a first clamping portion formed by bending from one end of the first main body portion upward, the cover plate comprises a second main body portion and a second clamping portion formed by bending from one end of the second main body portion upward, the fixed clamping arm is formed by surrounding the first clamping portion and the second clamping portion, the second clamping portion is provided with a mounting hole for the connecting plug to protrude, the upper surface of the second main body portion is provided with recesses adapted to pad feet of the notebook computer, and the upper surface of the second main body portion matches the bottom surface of the notebook computer to form surface contact.

2. The expansion chassis for a notebook computer according to claim 1, wherein the connecting plug is a Type-C plug, and at least one Type-C plug is disposed and is configured to supply power to the expansion chassis by the notebook computer and/or enable the notebook computer to establish a data communication connection with the expansion chassis.

3. The expansion chassis for a notebook computer according to claim 1, wherein the plug-in interfaces of the plug-in mechanism comprise at least one Type-C plug-in port; and the fixed structure is a mounting plug adapted to a headphone jack of the notebook computer.

4. The expansion chassis for a notebook computer according to claim 1, wherein the outer side surface of the first main body portion is flush with a corresponding side surface of the notebook computer.

5. The expansion chassis for a notebook computer according to claim 1, wherein a slot adapted to the second circuit board is disposed in the first clamping portion, the connecting plug and the second circuit board are disposed perpendicular to each other, and the connecting plug penetrates through the mounting hole to extend out of the inner side surface of the second clamping portion.

6. The expansion chassis for a notebook computer according to claim 1, wherein the clamping mechanism further comprises a tension spring, the movable clamping arm comprises a mounting portion and a clamping arm portion formed by bending and extending from the outer end of the mounting portion upward, the mounting portion is provided with a first mounting column, the first main body portion is provided with a through slot adapted to the mounting portion and a second mounting column adapted to the first mounting column, the through hole is disposed in the side surface of the first main body portion away from the first clamping portion, the second mounting column is disposed in the first main body portion, the mounting portion of the movable clamping arm penetrates through the through hole to extend into the first main body portion, one end of the tension spring sleeves the first mounting column, the other end of the tension spring sleeves the second mounting column, and the mounting plug is disposed on the clamping arm portion.

7. The expansion chassis for a notebook computer according to claim 6, wherein a limiting block and a limiting slot adapted to the mounting portion are disposed in the first main body portion, the slot bottom of the limiting slot is provided with a guide rib for stably moving the mounting portion, the inner end surface of the mounting portion abuts against the outer end surface of the limiting block, and the first main body portion is provided with a plurality of heat dissipation holes for facilitating heat dissipation.

8. The expansion chassis for a notebook computer according to claim 1, wherein the bottom of the base is provided with hidden pad feet or non-slip pad feet; the inner sides of the movable clamping arm and the fixed clamping arm are provided with soft rubber pads; and the upper surface of the base is provided with a retreating slot, and the retreating slot is configured to form a heat dissipation gap with the bottom surface of the notebook computer for facilitating heat dissipation of the notebook computer.

9. The expansion chassis for a notebook computer according to claim 2, wherein the first main body portion is provided with a third mounting column protruding upward, the third mounting column is axially provided with a screw hole, the lower end surface of the cover plate is provided with a fourth mounting column protruding downward, the fourth mounting column is axially provided with a mounting slot adapted to the third mounting column, the slot bottom of the mounting slot is axially provided with a through hole adapted to the screw hole, and the cover plate is mounted above the bottom box by the cooperation between the third mounting column and the mounting slot, and the cooperation between the bolt penetrating through the through hole and the screw hole.

\* \* \* \* \*